US006683718B2

United States Patent
Sugiyama et al.

(10) Patent No.: US 6,683,718 B2
(45) Date of Patent: Jan. 27, 2004

(54) DIFFRACTIVE OPTICAL ELEMENT AND IMAGE READER USING THE SAME

(75) Inventors: Takayuki Sugiyama, Tochigi (JP); Hiroshi Sato, Kanagawa (JP); Motomu Fukasawa, Saitama (JP); Hidekazu Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 09/961,422

(22) Filed: Sep. 25, 2001

(65) Prior Publication Data

US 2002/0039233 A1 Apr. 4, 2002

(30) Foreign Application Priority Data

Oct. 2, 2000 (JP) ........................ 2000-302605

(51) Int. Cl.[7] .................................... G02B 5/18
(52) U.S. Cl. ...................... 359/569; 359/576
(58) Field of Search ................ 359/576, 569, 359/571

(56) References Cited

U.S. PATENT DOCUMENTS

| 5,044,706 A | 9/1991 | Chen .................... 359/357 |
| 5,790,321 A | 8/1998 | Goto .................... 359/742 |
| 6,122,104 A * | 9/2000 | Nakai .................... 359/576 |
| 6,507,437 B1 * | 1/2003 | Nakai .................... 359/576 |

FOREIGN PATENT DOCUMENTS

| JP | 4-213421 | 8/1992 |
| JP | 6-324262 | 11/1994 |
| JP | 11-344611 | 12/1999 |

OTHER PUBLICATIONS

Lawrence, G.N., "International Lens Design Conference," Proc. SPIE vol. 1354, 1990 (Jun. 11–14 1990), Monterey, CA., pp. 24–29, contents p. iii, ISBN 0–8194–0415–2.

* cited by examiner

Primary Examiner—Mark A. Robinson
Assistant Examiner—Alessandro Amari
(74) Attorney, Agent, or Firm—Fitzpatrick, Cella, Harper & Scinto

(57) ABSTRACT

A laminate-type diffractive optical element which is easily producible and which allows high optical performance to be easily achieved, and an optical system using the same, are disclosed. In the diffractive optical element formed by laminating a plurality of diffraction gratings, when the distance between the uppermost portion of one diffraction grating and the lowermost portion of the other diffraction grating in two diffraction gratings adjacent to each other along the incident direction of a light is represented by D ($\mu$m), these two diffraction gratings are arranged to satisfy the following relation: 10 $\mu$m<D<40 $\mu$m.

13 Claims, 4 Drawing Sheets

FIG. I

DIFFRACTIVE OPTICAL ELEMENT AND IMAGE READER USING THE SAME

BACKGROUND OF THE INVENTION

1. Field of the Invention

The present invention relates to a diffractive optical element and an optical system using the same, which are suitable for various types of optical systems, such as an exposure apparatus for use in producing devices, a lighting device, a photographic camera, binoculars, a projector, a telescope, a microscope, a copying machine, a multifunction printer, an image scanner, a facsimile, etc.

In particular, the present invention relates to a diffractive optical element provided in an image reading element, the diffractive optical element being applied to an image reader, such as a copying machine, an image scanner, a multifunction printer, a facsimile, or the like, which comprises a control circuit controlling the relative motion between an original platen and a CCD, and a control circuit controlling the detection signals of the CCD.

2. Description of the Related Art

As one of methods of correcting chromatic aberrations of an optical system, a method has been used wherein two lens materials having dispersion different from each other are combined. In contrast to this chromatic-aberration reducing method by the combination of lens materials, chromatic-aberration reducing methods by using a diffractive optical element having diffractive effect for a lens surface or a portion of an optical system, are disclosed in literatures such as SPIE Vol. 1354, International Lens Design Conference (1990), and in Japanese Patent Laid-Open Nos. 4-213421, 6-324262, U.S. Pat. No. 5,044,706, etc. These disclosures make use of a physical phenomenon that, regarding the way in which chromatic aberrations with respect to a light beam with a reference wavelength occurs in an optical system, there is an inverse relation between a diffractive surface and a refractive surface.

Such a diffractive optical element can provide an effect like an aspherical lens by changing the period of the periodical structure of the diffraction grating thereof, thereby exerting a significant effect in reducing aberrations.

Comparing a diffraction action of a light with a refraction action thereof, one light beam remains one light beam even after refracting on a lens surface, whereas one light beam is split into some light beams with some orders after being diffracted on a diffraction grating.

When using a diffractive optical element as a lens system, therefore, it is necessary to determine a grating structure so that the light flux in an operating wavelength region is concentrated on the light of a particular order (design order). When the light of the particular order is concentrated, the other diffraction lights exhibit low intensities, and when the other diffraction lights exhibit zero intensity, it means that they do not exist. In order for the diffractive optical element to have the above-described features, the diffraction light of a particular order must have a sufficiently high intensity. If there exist lights of diffraction orders other than the particular order, and these lights are made incident on the spots other than those of the light of the particular order, the lights will become flare lights (harmful lights).

In an optical system using a diffractive optical element, therefore, it has been necessary to solve the above-described problem. As solutions to this problem, two types of proposals have been made. One is a laminate-type diffractive optical element having a laminate sectional shape wherein first and second diffraction gratings 103 and 102 are overlaid on a substrate glass 101, as shown in FIG. 6. Another is a laminate-type diffractive optical element, as shown in FIG. 7, wherein first and second diffraction gratings 104 and 105 are formed over substrate glasses 106 and 107, respectively, and wherein the first and second diffraction gratings are overlaid to each other via an air layer so that the pitches of the two mating diffraction grating surfaces correspond between the two surfaces.

The grating thicknesses $d_1$ and $d_2$ of the diffraction gratings 104 and 105 are determined by the refraction indices $n_{01}$ and $n_{02}$ of the material, and a reference wavelength $\lambda_0$, using the following equation.

$$(n_{01}-1) \times d_1 - (n_{02}-1) \times d_2 = m \times \lambda_0 \tag{1}$$

This is an equation used for maximizing the diffraction efficiency of the diffraction light of a m-th order in the reference wavelength $\lambda_0$. The refraction indices $n_{01}$ and $n_{02}$, and the grating thicknesses $d_1$ and $d_2$ are determined so as to satisfy the above-described relationship.

As producing methods for a diffractive optical element, injection molding, pressure molding, and the like are used.

A method for producing a laminate-type diffractive optical element using injection molding and pressure molding, is disclosed in Japanese Patent laid-Open No. 11-344611.

In a laminate-type diffractive optical element, it is necessary to appropriately set the grating shapes of one diffraction grating and the other diffraction grating. For example, if the distance between the grating surfaces of two diffraction gratings is too wide, the diffraction light of a predetermined order which has been diffracted on one grating surface will not be made incident on the other facing grating surface. On the other hand, if the distance between the two grating surfaces is too narrow, one grating surface will contact the other grating surface during production, thereby imparing the grating surfaces. These make it difficult for the diffractive optical element to achieve a high diffraction efficiency, so that the correcting effect of the diffractive optical element with respect to chromatic aberrations becomes insufficient when used as a portion of an optical system.

SUMMARY OF THE INVENTION

Accordingly, it is an object of the present invention to provide a diffractive optical element allowing a high diffraction efficiency to be achieved, and to provide an optical system using the same.

In order to achieve the above-described object, the present invention provides a diffractive optical element formed by laminating a plurality of diffraction gratings, wherein two diffraction gratings adjacent to each other along the incident direction of light satisfy the following relation:

10 $\mu$m<D<40 $\mu$m, when the distance between the uppermost portion of one diffraction grating and the lowermost portion of the other diffraction grating is represented by D ($\mu$m).

Preferably, at least one of the above-described two diffraction gratings is molded by injection molding.

Also, it is preferable that the two diffraction gratings be formed by opposingly disposing the surface of one diffraction grating over the surface of the other diffraction grating which has the same pitch as that of the one diffraction grating and which has a grating thickness different from that of the one diffraction grating.

Furthermore, it is preferable that the two diffraction gratings be formed by jointing the surface of the one diffraction grating to the surface of the other diffraction grating face to face via an air layer.

The arrangement may be such that the two diffraction gratings are formed by jointing the surface of the one diffraction grating to the surface of the other diffraction grating face to face via an optical material.

Preferably, the two diffraction gratings are formed of materials of which the dispersion is different between the materials.

Preferably, the diffractive optical element molded by injection molding be formed of a plastic material.

It is preferable that one of the above-described two diffraction gratings be formed of an ultraviolet-cured resin.

Furthermore, it is preferable that one of the two diffraction gratings comprise a substrate and a grating portion formed over the substrate, the grating portion being made of a material different from that of the substrate.

Preferably, the above-described grating portion is formed of an ultraviolet-cured resin.

The above-described substrate may a flat plate, or a curved plate.

Moreover, the present invention provides an image reader comprising a diffractive optical element in accordance with the present invention, and a control circuit which generates the control signals in the image reader.

Further objects, features and advantages of the present invention will become apparent from the following description of the preferred embodiments with reference to the attached drawings.

DESCRIPTION OF THE PREFERRED EMBODIMENTS

First Embodiment

Figure 1:
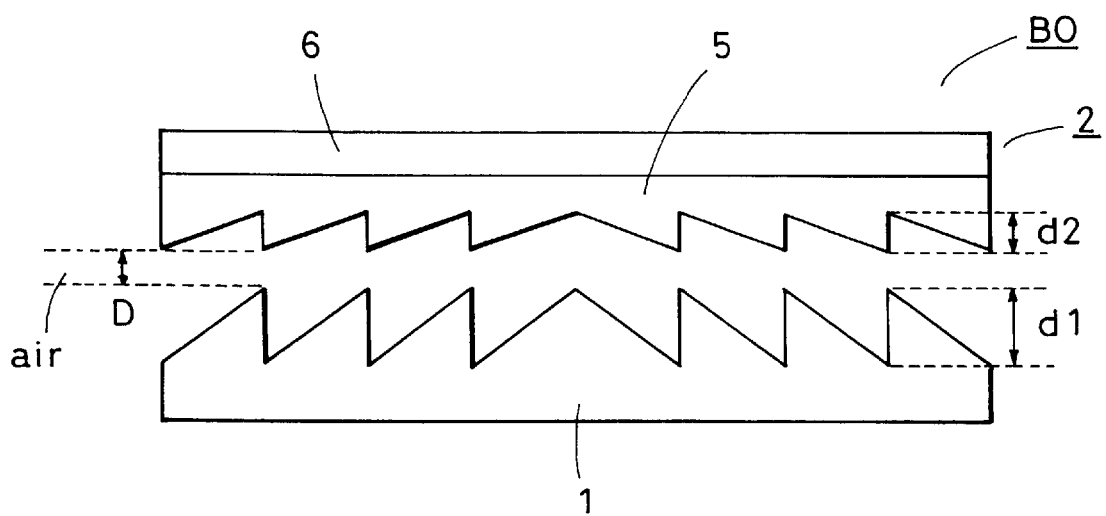
FIG. 1 is a sectional view of the main section of a diffractive optical element in accordance with a first embodiment of the present invention.

FIG. 1 is a sectional view of the main section of a laminate-type diffractive optical element BO in accordance with a first embodiment of the present invention. FIG. 1 is arranged so that diffraction gratings are deformed in the depth direction thereof.

In FIG. 1, the diffractive optical element BO is constructed by disposing a first diffraction grating 1 molded by injection molding, and a second diffraction grating 2 which has the same grating pitch as that of the first diffraction grating 1 and which is formed by a medium different from that of the first diffraction grating 1 so as to be opposed to each other via an air layer or an optical material (refractive index n>1). FIG. 1 shows the case where an air layer is used. Here, $d_1$ and $d_2$ are the grating thicknesses of the first and second diffraction gratings 1 and 2, which are different from each other. As shown in FIG. 1, in this embodiment, the first diffraction grating 1 is molded by integrating a substrate and a diffraction grating by injection molding. This facilitates the production of the diffractive optical element. On the other hand, the second diffraction grating 2 is constructed by forming a diffraction grating 5 over a substrate 6 using an ultraviolet-cured resin, and by disposing the second diffraction grating 2 so as to face the diffraction grating 1 formed by injection molding. Here, the substrate 6 may be a flat plate or a curved plate.

The diffractive optical element is arranged so that the diffraction grating 1 molded by injection molding forms the first diffraction grating surface or the last diffraction grating surface as viewed from the incident side of a light. This allows the diffraction grating molded by injection molding to be used as the base of a laminate-type diffraction grating. As a medium for molding the diffraction grating 2, a medium different in the dispersion from the diffraction grating 1 is used. Thereby, a high diffraction efficiency can be achieved in the entire region of visible light wavelength.

For example, in FIG. 1, for the medium of the diffraction grating 1, XEONEX (Nippon Zeon Corporation) as a trade name, which is a plastic optical material capable of injection molding, is used. On the other hand, for the medium of the diffraction grating 2, as a medium having dispersion higher than that of the diffraction grating 1, UV1000 (Mitsubishi Chemical Corporation) as a trade name, which is an ultraviolet-cured resin, is used. In this embodiment, therefore, the grating thicknesses of the diffraction gratings 1 and 2 are set to be $d_1=8.2\ \mu m$ and $d_2=5.9\ \mu m$, respectively, on the basis of the relationship between the refractive indices of the media and the wavelengths thereof.

In this embodiment, the distance D ($\mu m$) between the uppermost portion of one diffraction grating 1 and the lowermost portion of the other diffraction grating 5 is arranged to be $$10\ \mu m < D < 40\ \mu m \tag{2}$$

This facilitates producing two adjacent diffraction gratings, and allows the diffractive optical element having a high diffraction efficiency and capable of sufficiently correcting chromatic aberrations to be provided. If the distance D becomes lower than the lower limit (10 $\mu m$) of the above-described conditional equation (2), the two grating surfaces will be inconveniently prone to contact each other during production. On the other hand, if D exceeds the upper limit (40 $\mu m$), the light which has been diffracted on a diffractive surface will miss a corresponding diffractive surface, so that the diffraction efficiency will be inconveniently reduced.

In the present invention, it is more preferable that the range of numeral values of the conditional equation (2) be substantially set to be $$20\ \mu m < D < 35\ \mu m \tag{2a}$$

The technical significance of the upper limit (35 $\mu m$) and the lower limit (20 $\mu m$) is the same as the case of the conditional equation (2).

In this embodiment, the distance $D=30\ \mu m$ is adopted.

Second Embodiment

Figure 2:
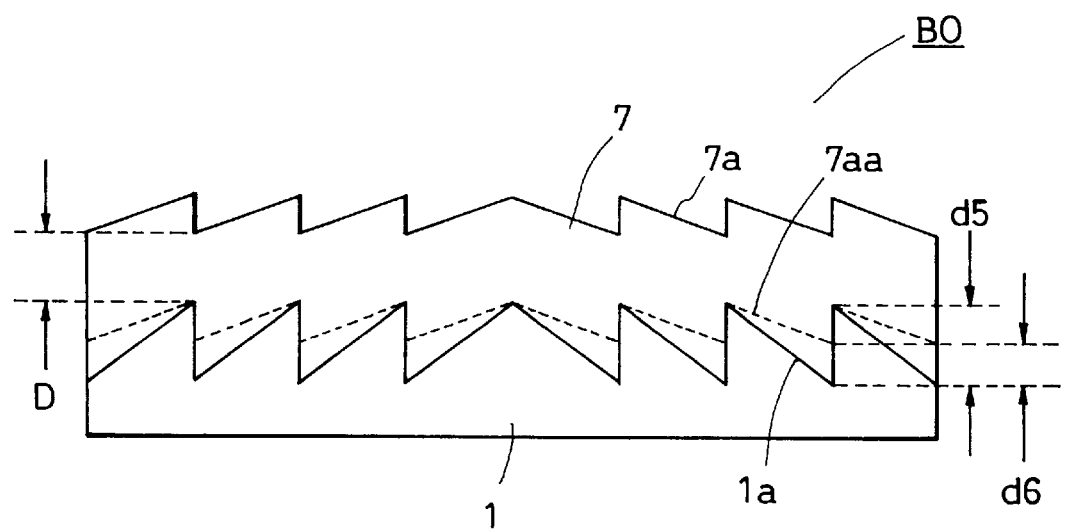
FIG. 2 is a sectional view of the main section of a diffractive optical element in accordance with a second embodiment of the present invention.

FIG. 2 is a sectional view of the main section of a diffractive optical element in accordance with a second embodiment of the present invention. In FIG. 2, reference numeral 1 denotes a first diffraction grating formed by injection molding using a plastic, and the shape and material thereof are the same as those of the first embodiment. Reference numeral 7 denotes a second diffraction grating, which is formed over the first diffraction grating 1 as a replica.

The second diffraction grating 7 has the same grating pitch as that of the first diffraction grating 1, but is different in the material from the first diffraction grating 1. For example, the second diffraction grating 7 is formed of an ultraviolet-cured resin. In FIG. 2, a grating surface 7aa schematically shows the state wherein a grating surface 7a has been parallelly shifted to the grating surface 1a side of the first diffraction grating 1, in order to demonstrate that the grating pitch is the same between the first and second diffraction gratings 1 and 7.

In this embodiment, letting the distance between the uppermost portion of the diffraction grating 1 formed by injection molding and the lowermost portion of the diffraction grating 7 which has a grating surface opposed to the uppermost portion of the diffraction grating 1 be D ($\mu$m), the distance D has a value larger than 10 $\mu$m and smaller than 40 $\mu$m. If D<10 $\mu$m, there is a high probability that the mold for molding the diffraction grating 7 will contact the diffraction grating 1. On the other hand, if D>40 $\mu$m, since the diffractive optical element self has a considerable thickness, the performance thereof will become inferior to the desired one. In this embodiment, the distance D=30 $\mu$m is used.

Furthermore, if D<10 $\mu$m, it will be impossible to form the second diffraction grating 7 made of an ultraviolet-cured resin over the surface of the first diffraction grating 1 as a replica, considering that the grating thickness of the second diffraction grating 7 is of the order of several $\mu$m.

Meanwhile, in this embodiment, the same media as those of the first embodiment is used. The grating thicknesses $d_5$ and $d_6$ of the first and second diffraction gratings 1 and 7 are set to be $d_5$=8.2 $\mu$m, and $d_6$=5.9 $\mu$m, respectively.

Third Embodiment

Figure 3:
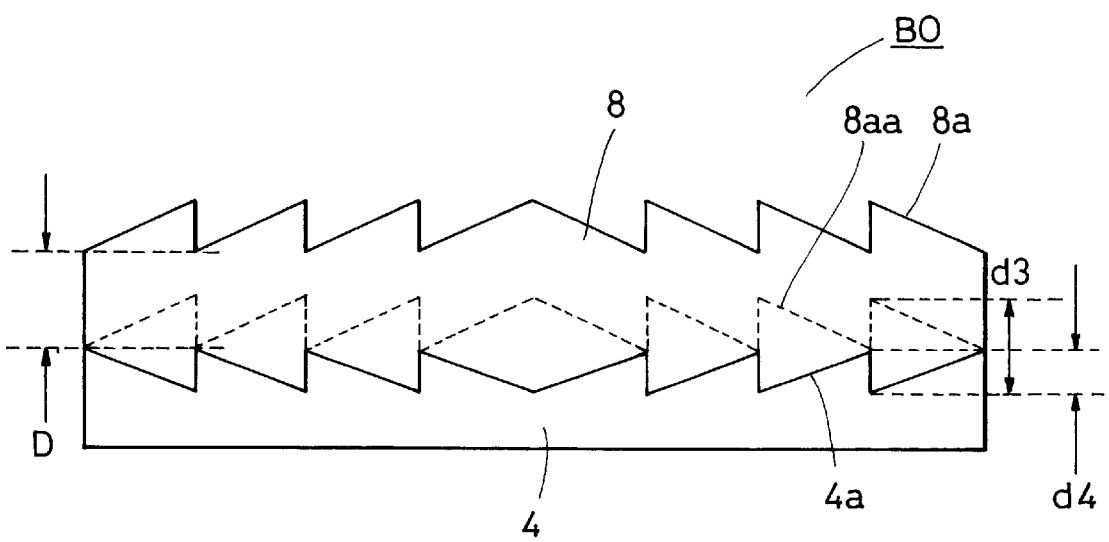
FIG. 3 is a sectional view of the main section of a diffractive optical element in accordance with a third embodiment of the present invention.

FIG. 3 is a sectional view of the main section of a diffractive optical element in accordance with a third embodiment of the present invention. In FIG. 3, reference numeral 4 denotes a first diffraction grating, which is formed by injection molding as in the cases of the first and second embodiments shown in FIGS. 1 and 2, respectively. Reference numeral 8 denotes a second diffraction grating, which is formed over the first diffraction grating 1 as a replica.

The second diffraction grating 8 has the same grating pitch as that of the first diffraction grating 4, but is different in the material from the first diffraction grating 4. For example, the second diffraction grating 8 is formed of an ultraviolet-cured resin. In FIG. 3, a grating surface 8aa schematically shows the state wherein a grating surface 8a has been parallelly shifted to the grating surface 4a side of the first diffraction grating 4, in order to demonstrate that the grating pitch is the same between the first and second diffraction gratings 4 and 8.

In this embodiment, letting the distance between the uppermost portion of the diffraction grating 4 formed by injection molding and the lowermost portion of the diffraction grating 8 which has a grating surface opposed to the uppermost portion of the diffraction grating 4 be D ($\mu$m), the distance D has a value larger than 10 $\mu$m and smaller than 40 $\mu$m. If D<10 $\mu$m, there is a high probability that the mold for molding the diffraction grating 8 will contact the diffraction grating 4. On the other hand, if D>40 $\mu$m, since the diffractive optical element self has a considerable thickness, the performance thereof will become inferior to the desired one. In this embodiment, D=30 $\mu$m is used. The grating thicknesses $d_3$ and $d_4$ of the first and second diffraction gratings 4 and 8 are set to be $d_3$=19.5 $\mu$m, and $d_4$=16.1 $\mu$m, respectively.

First Embodiment of Optical System

Figure 4:
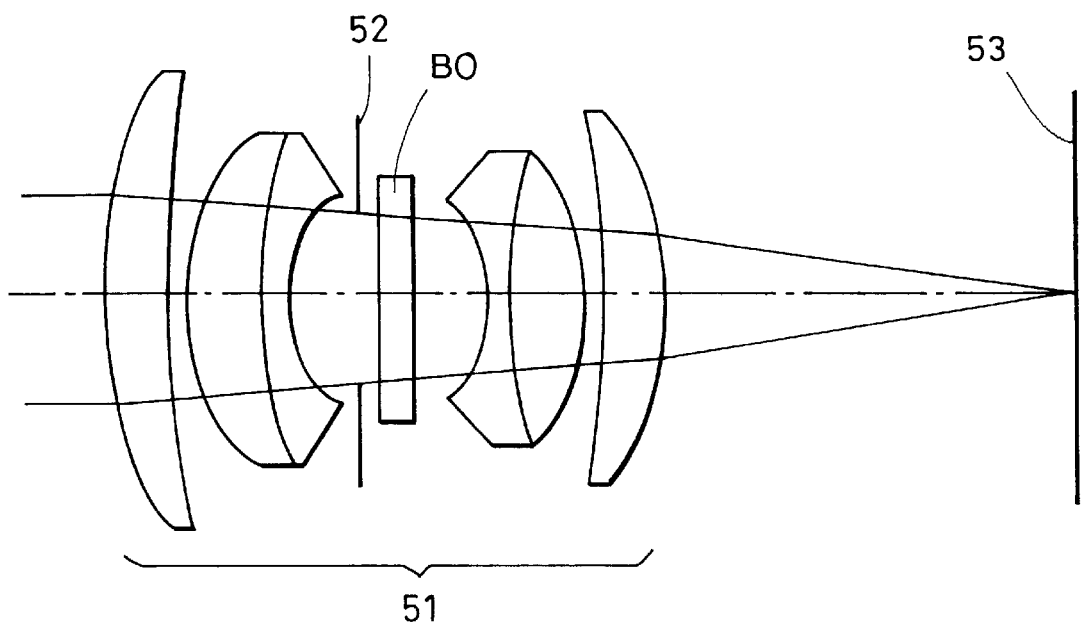
FIG. 4 is a schematic diagram of an optical system using a diffractive optical element in accordance with the present invention.

FIG. 4 is a schematic diagram of an first embodiment of an optical system using a diffractive optical element in accordance with the present invention, wherein the section of a photographing optical system such as a camera is shown. In FIG. 4, reference numeral 51 denotes a photographing lens, which has a diaphragm 52 and a diffractive optical element BO therewithin. Reference numeral 53 denotes a film or a CCD which constitutes an image-forming surface.

Since the wavelength dependency of the diffraction efficiency of this first embodiment of optical system has been significantly improved by using a diffractive optical element with a laminate structure, this embodiment has achieved a high-performance photographing lens which is low in flare and which has a high resolution in the lower frequency region. Moreover, since the diffractive optical element in accordance with the present invention can be produced by a simple method, a mass-producible and inexpensive lens can be provided as the photographing lens.

In FIG. 4, the diffractive optical element BO is provided on the surface of a plate glass in the vicinity of the diaphragm 52, but the diffractive optical element in accordance with the present invention is not limited to this example. Alternatively, the diffractive optical element BO may be provided on the surface of a curved lens, or a plurality of diffractive optical elements may be used within the photographing lens.

In this embodiment, an example wherein the diffractive optical element in accordance with the present invention is applied to a photographing lens for camera has been shown, but the use of the diffractive optical element in accordance with the present invention is not restricted to a photographing lens for camera. Similar effect can also be obtained when the present invention is applied to a photographing lens for video camera, an image scanner for business machine, a reader lens for digital copying machine, an exposure device for use in producing semiconductor devices, or the like.

Particularly, in this embodiment, the diffractive optical element in accordance with the present invention is applied to an image reader such as a digital copy machine, an image scanner, a multifunction printer, a facsimile, or the like, which comprises a control circuit controlling the relative motion between an original platen and a CCD, and a control circuit controlling the detection signals of the CCD.

In this embodiment, the case where two diffraction gratings are opposingly disposed has been taken as an example, but the present invention is not limited to this case. The present invention may also be applied to a diffractive optical element wherein at least three diffraction gratings are combined.

Second Embodiment of Optical System

Figure 5:
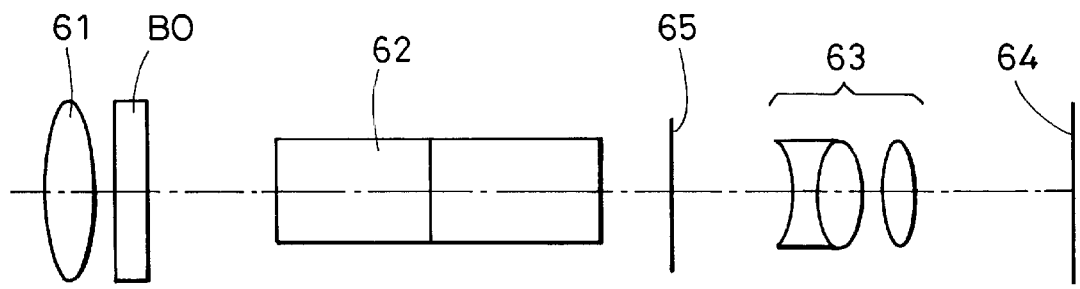
FIG. 5 is a schematic diagram of an optical system using a diffractive optical element in accordance with the present invention.
Figure 6:
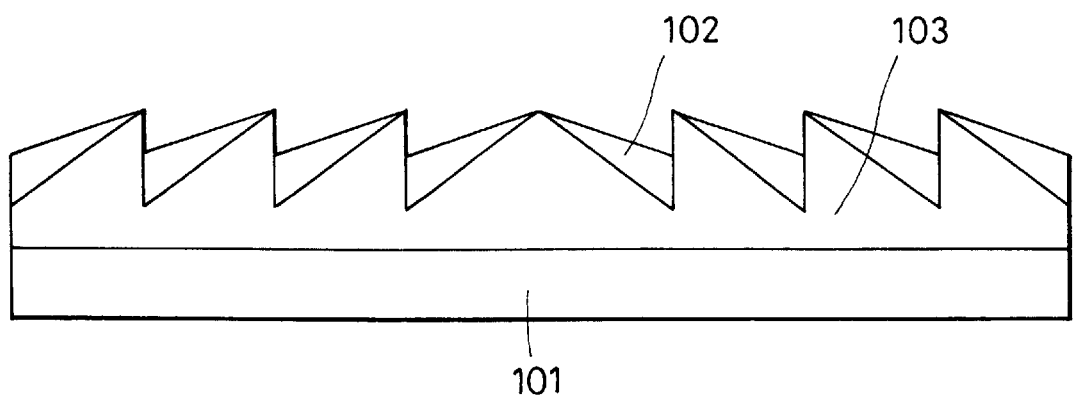
FIG. 6 is a diagram explaining a conventional laminate-type diffractive optical element.
Figure 7:
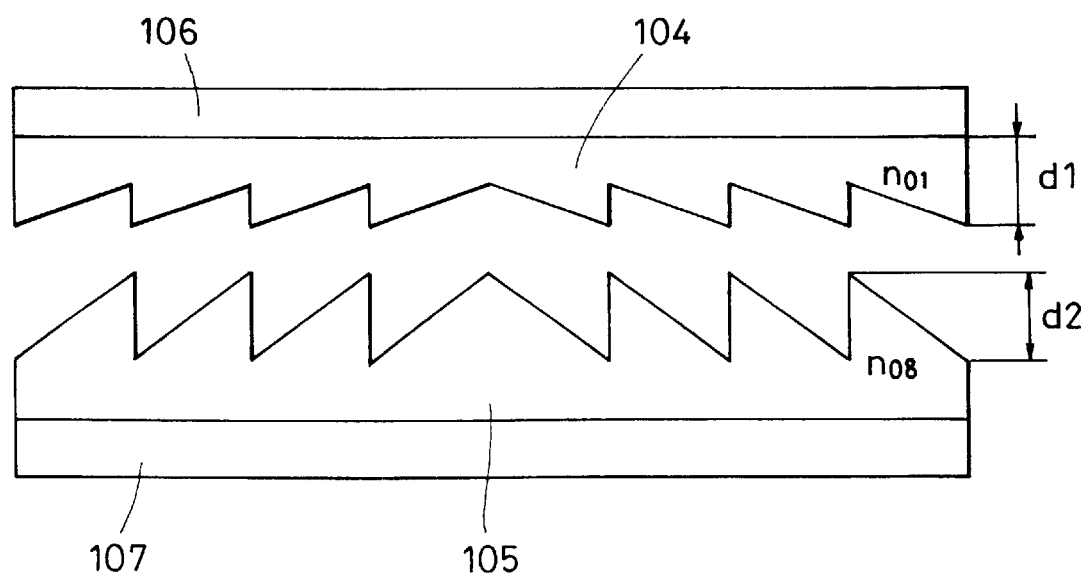
FIG. 7 is a diagram explaining a conventional laminate-type diffractive optical element.

FIG. 5 is a schematic diagram of an second embodiment 2 of an optical system using a diffractive optical element in accordance with the present invention, wherein the section of observation optical system such as binoculars is shown. In FIG. 5, reference numeral 61 denotes an objective lens, 62 denotes an image-inverting prism for inverting an image, 63 designates an eyepiece, and 64 designates an evaluation surface (pupil surface).

In FIG. 5, a diffractive optical element BO is formed for the purpose of correcting chromatic aberrations and others on the image-forming surface 65 in the objective lens 61.

Since the wavelength dependency of the diffraction efficiency of this second embodiment of optical system is significantly improved by using a diffractive optical element with a laminate structure, this embodiment has achieved a high-performance objective lens which is low in flare and which has a high resolution in the lower frequency region. Moreover, since the diffractive optical element in accordance with the present invention can be produced by a simple method, a mass-producible and inexpensive lens can be provided as the observation optical system.

In this embodiment, an example wherein the diffractive optical element BO is formed in the objective lens portion 61 has been shown, but the use of the diffractive optical element in accordance with the present invention is not restricted to this example. Similar effect can also be obtained when the present invention is applied to the case wherein the diffractive optical element BO is formed on the surface of the prism 62 or within the eyepiece 63. If the diffractive optical element BO is provided at a position closer to an object than the image-forming surface 65, the objective lens 61 will exert a chromatic aberration reducing effect by itself. Therefore, in the case of an observation optical system with a naked eye, it is desirable to dispose the diffractive optical element BO at least on the side of the objective lens 61.

In this embodiment, an example wherein the diffractive optical element in accordance with the present invention is applied to binoculars has been shown, but the use of the diffractive optical element in accordance with the present invention is not restricted to this example. Similar effect can also be obtained when the present invention is applied to an terrestrial or astronomical telescope, or to an optical viewfinder of a lens-shutter camera, a video camera, or the like.

As is evident from the foregoing, in accordance with the present invention, by appropriately setting the distance between the two diffraction gratings adjacent to each other along the incident direction of a light in a laminate-type diffractive optical element, a diffractive optical element which allows a high diffraction efficient to be realized, and an optical system using the same can be achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of following claims is to be accorded the broadest interpretation so as to encompass all such modifications and equivalent structures and functions.

What is claimed is:

1. A diffraction optical element formed by laminating a plurality of diffraction gratings having a plurality of grating surfaces, wherein two non-overlapping grating surfaces adjacent to each other along an incident direction of a light satisfy the following relation:

$$10 \ \mu m < D 40 \ \mu m,$$

wherein D represents a distance between an uppermost portion of one of said two grating surfaces and a lowermost portion of the other of said two grating surfaces, and wherein said uppermost portion and said lowermost portion correspond to respective portions of said two grating surfaces that are closest to each other.

2. A diffractive optical element in accordance with claim 1, wherein at least one of said two diffraction gratings is molded by injection molding.

3. A diffractive optical element in accordance with claim 2, wherein said diffractive optical element molded by injection molding is formed of a plastic material.

4. A diffractive optical element in accordance with claim 1, wherein said two diffraction gratings are formed by opposingly disposing the surface of one diffraction grating over the surface of the other diffraction grating, and wherein said other diffraction grating has the same pitch as that of said one diffraction grating and has a grating thickness different from that of said one diffraction grating.

5. A diffractive optical element in accordance with claim 1, wherein said two diffraction gratings are formed such that the surface of one diffraction grating and the surface of the other diffraction grating face each other with an air layer between them.

6. A diffractive optical element in accordance with claim 1, wherein said two diffraction gratings are formed such that the surface of one diffraction grating and the surface of the other diffraction grating face each other with an optical material between them.

7. A diffractive optical element in accordance with claim 1, wherein said two diffraction gratings are formed of materials of which a dispersion is different between said materials.

8. A diffractive optical element in accordance with claim 1, wherein one of said two diffraction gratings is formed of an ultraviolet-cured resin.

9. A diffractive optical element in accordance with claim 1, wherein one of said two diffraction gratings comprises a substrate and a grating portion formed over said substrate, said grating portion being made of a material different from that of said substrate.

10. A diffractive optical element in accordance with claim 9, wherein said grating portion is formed of an ultraviolet-cured resin.

11. A diffractive optical element in accordance with claim 10, wherein said substrate is a flat plate.

12. A diffractive optical element in accordance with claim 10, wherein said substrate has a curved surface.

13. An image reader comprising:

a diffractive optical element in accordance with any one of claims 1 to 12; and a control circuit which generates the control signals in said image reader.

* * * * *

UNITED STATES PATENT AND TRADEMARK OFFICE
CERTIFICATE OF CORRECTION

PATENT NO. : 6,683,718 B2
DATED : January 27, 2004
INVENTOR(S) : Takayuki Sugiyama et al.

It is certified that error appears in the above-identified patent and that said Letters Patent is hereby corrected as shown below:

Column 7,
Line 57, "$10\,\mu m < D40\,\mu m$," should read -- $10\,\mu m < D < 40\,\mu m$, --.

Signed and Sealed this

Twenty-ninth Day of June, 2004

JON W. DUDAS
*Acting Director of the United States Patent and Trademark Office*